United States Patent [19]

Magee

[11] Patent Number: 4,845,959

[45] Date of Patent: Jul. 11, 1989

[54] FRUITS AND VEGETABLES PRECOOLING, SHIPPING AND STORAGE CONTAINER

[75] Inventor: Charles Magee, Fort Valley, Ga.

[73] Assignee: Fort Valley State College, Ft. Valley, Ga.

[21] Appl. No.: 212,303

[22] Filed: Jun. 27, 1988

[51] Int. Cl.[4] ............................................. F25D 3/08
[52] U.S. Cl. .................................. 62/457.1; 62/310; 62/459; 62/461
[58] Field of Search ................. 62/430, 431, 460, 461, 62/457, 64, 376, 310

[56] References Cited

U.S. PATENT DOCUMENTS

| | | |
|---|---|---|
| 209,621 | 11/1878 | Miller . |
| 397,984 | 2/1889 | Hess et al. . |
| 415,362 | 11/1889 | Hawes . |
| 492,503 | 2/1893 | Sickles . |
| 599,172 | 2/1898 | Gaines .................................. 62/457 |
| 624,165 | 5/1899 | Bowdish ........................... 62/457 X |
| 651,011 | 6/1900 | Griffin . |
| 687,341 | 11/1901 | Ryan ..................................... 62/310 |
| 697,111 | 4/1902 | Sullivan . |
| 794,630 | 7/1905 | Merrill ............................... 62/460 X |
| 1,123,701 | 1/1915 | Dahl . |
| 1,170,658 | 2/1916 | Mitchell ............................... 62/310 |
| 1,935,923 | 11/1933 | Thoke . |
| 2,038,218 | 4/1936 | Holt ................................ 62/459 X |
| 2,183,868 | 12/1939 | Kavan ............................. 62/461 X |
| 2,210,946 | 8/1940 | Moore . |
| 2,477,756 | 8/1949 | Lee . |
| 2,528,715 | 11/1950 | Wagner . |
| 2,543,524 | 2/1951 | De Oliveira ..................... 62/459 X |
| 2,678,543 | 5/1954 | Lapetina . |
| 2,734,349 | 2/1956 | Repking et al. . |
| 2,781,643 | 2/1957 | Fairweather ..................... 62/463 X |
| 4,265,095 | 5/1981 | McConachie ........................ 62/373 |

OTHER PUBLICATIONS

A. Lloyd Ryall and Werner J. Lipton, *Handling, Transportation and Storage of Fruits and Vegetables*, (2d ed., vol. 1, chap. 10, 1979).

*Primary Examiner*—Lloyd L. King
*Attorney, Agent, or Firm*—Kilpatrick & Cody

[57] ABSTRACT

An inexpensive insulated container and container system for receiving fruits, vegetables, or other plant materials particularly including leafy vegetables, in the field or packing facility, transporting such products and, if desired, storing them. A stackable insulated chest is provided with a lid-mounted ice cavity that may be removed and replaced through an access door without removing the lid or unstacking the containers. An alternative embodiment includes a lid-mounted manifold through which water may be introduced from outside the container, and alternative structures are disclosed for diverting water from stacked containers or circulating it through stacked containers.

13 Claims, 3 Drawing Sheets

FRUITS AND VEGETABLES PRECOOLING, SHIPPING AND STORAGE CONTAINER

BACKGROUND OF THE INVENTION

The present invention relates to containers for precooling and shipping fruits and vegetables, particularly leafy vegetables, and methods and apparatus for storing such fruits and vegetables in an environment which will delay their deterioration.

It has long been recognized that deterioration and decay of fruits and vegetables can be slowed by lowering their temperature as soon as possible after harvest and, in some instances, by taking steps to reduce water loss by the vegetables. See, for instance, Chapter 10, "Treatments Prior to Shipment or Storage" of A. Lloyd Ryall and Werner J. Lipton, *Handling, Transportation and Storage of Fruits and Vegetables* (2nd ed., Vol. 1, 1979), which is incorporated herein by this reference. The use of ice in combination with a wide variety of storage and container structures has also long been known for initially cooling or chilling and subsequently maintaining vegetables at lowered temperatures. The use of water from melted ice and other sources of water is also known for maintenance of a wet environment in which water loss from fruits and vegetables is minimized. Examples of such prior art structures and methods are disclosed in U.S. Pat. Nos. 2,477,756, 2,734,349 and 4,265,095.

There remains a need, however, for apparatus and methods for economically and effectively cooling or chilling fruits and vegetables, maintaining those plant products in a cooled or chilled, wet environment, preferably until purchased by the consumer, and transporting them from the field to the consumer.

SUMMARY OF THE INVENTION

The present invention provides alternative embodiments of an inexpensive insulated container and container system for receiving fruits and vegetables, particularly including leafy vegetables, in the field or a packing facility near the point of harvest, transporting the vegetables to a food processing plant, restaurant or retail outlet, and, if desired, storing the vegetables until they are used or sold to a consumer. In a first embodiment of the invention, a stackable insulated chest or container is provided with a lid-mounted ice cavity that may be removed and replaced through an access door without removing the lid or unstacking the containers. As pre-formed ice in the ice cavity melts, it reduces the temperature inside the container, maintains the contents at a low temperature, and dispenses melted water throughout the container onto the fruits, vegetables or other plant materials such as transplants. Such melted water may exit the container through holes in the bottom and can be diverted from containers lower in a stack of containers by channels in container lids and sides. A second embodiment of the container of the present invention includes a lid-mounted manifold that surrounds the ice cavity and connects with an inlet in the top of the lid. The inlet may be closed to prevent water from entering the manifold or opened to receive water provided through a hose or which comes from containers stacked above a particular container to pass through the manifold and be dispensed through holes in its bottom onto vegetables within the container. Such water may be provided from a hose, particularly for initially wetting down the vegetables, or from drain-off from containers stacked above.

A structure for rack mounting such containers permits them to be stacked to virtually any desired height and may include an external source of cold water such as a refrigeration unit or vessel containing ice at the top of the rack and a drip pan to collect water at the bottom of the rack for later disposal or recirculation through the vegetable containers.

DETAILED DESCRIPTION OF THE DRAWINGS

Figure 1:
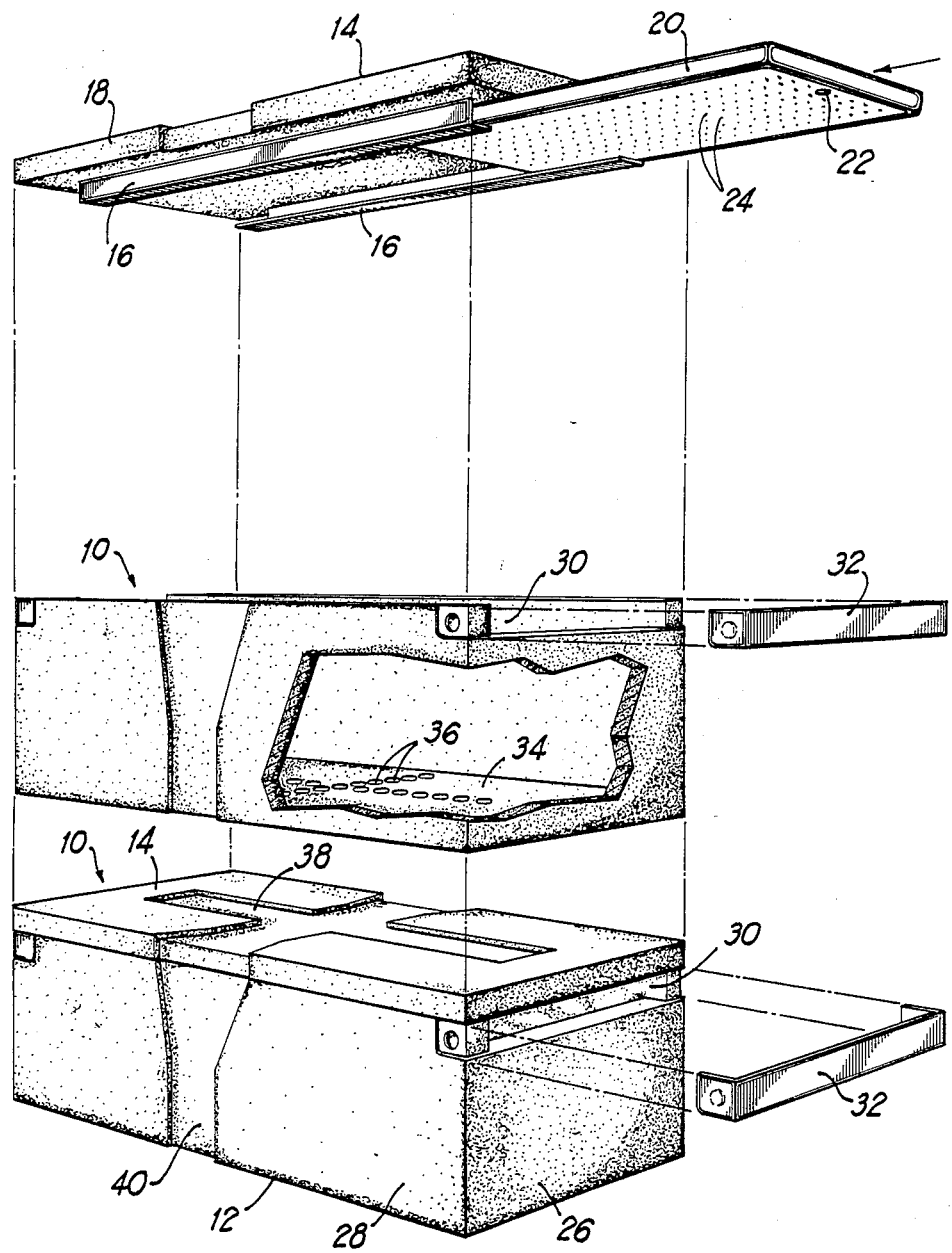
FIG. 1 is an exploded perspective view of two stacked shipping and storage containers of the present invention in a first embodiment of the invention.

FIG. 1 shows two containers 10 of the present invention in an exploded view of a stacked arrangement. Each container 10 comprises a generally rectangular chest 12 which may be formed of styrofoam, other insulating foam or a variety of other conventional materials able to provide necessary strength and, ideally, having favorable insulating properties. Chest 12 is covered by a lid 14 which, in the embodiment illustrated in FIG. 1, simply lies on top of chest 12. Lid 14 is fitted with brackets 16 on its underside which may be sections of right angle structure made of plastic, metal or other suitable material. Brackets 16 are aligned with and positioned near the longer edges 18 of lid 14 and are approximately as long as the external length of chest 12 so that brackets 16 keep lid 14 substantially in place on top of chest 12 by limiting lateral movement of lid 14. Brackets 16 receive an ice cavity 20 which may be slid into the brackets from either end of lid 14. Ice cavity 20 is a closed container of plastic, metal or other suitable material. Ice cavity 20 includes a fill hole 22 for filling the cavity with water, and its underside is perforated with a large number of small holes on the order of one millimeter in diameter. Ice cavity 20 is prepared for use by inverting it, filling it with liquid water, and freezing the water to form ice.

One or both end walls 26 of chest 12 are lower than the adjacent side walls 28 by at least the thickness of ice cavity 24. The opening 30 thereby created between lid 14 when it is in place on chest 12 and the upper edge of end wall 26 may be closed by a closure clip 32 or other suitable means such as a hinged access door. This arrangement permits removal and insertion of ice wall 20 in its receiving brackets 16 without removal of lid 14 from chest 12. It is thus possible to remove and insert ice cavity 20 in chests 12 which have been stacked.

The bottom 34 of chest 12 is provided with holes 36 to drain water out of the chest. The top of each lid 14 may be provided with appropriate channels to receive water dropping through holes 36 and route it to the side 28 of the chest. Side 28 may also be provided with a channel 40 to constrain water running down the side of the chest 12. As may be readily seen by reference to FIG. 1, one appropriate arrangement is placement of holes 36 in an "X" pattern with "arms" spanning the length and width of the bottom 34 of chest 12. Channel 38 may then be arranged in a similar "X" pattern under holes 36.

As will be readily appreciated, after a pre-frozen ice cavity is inserted in a container 12 filled with fruits, vegetables or other plant materials, ice in the cavity 20 will melt and cold water will slowly drip on the contents, thereby maintaining a cool, moist environment. Water will be drained from the bottom of chest 12 through holes 36 and, in the embodiment illustrated in FIG. 1, diverted to the side of the chest 12 and any additional containers 10 stacked below, thereby preventing possible contamination of other containers 10 by water carrying contaminates from the chest 12 through which it passes.

Figure 2:
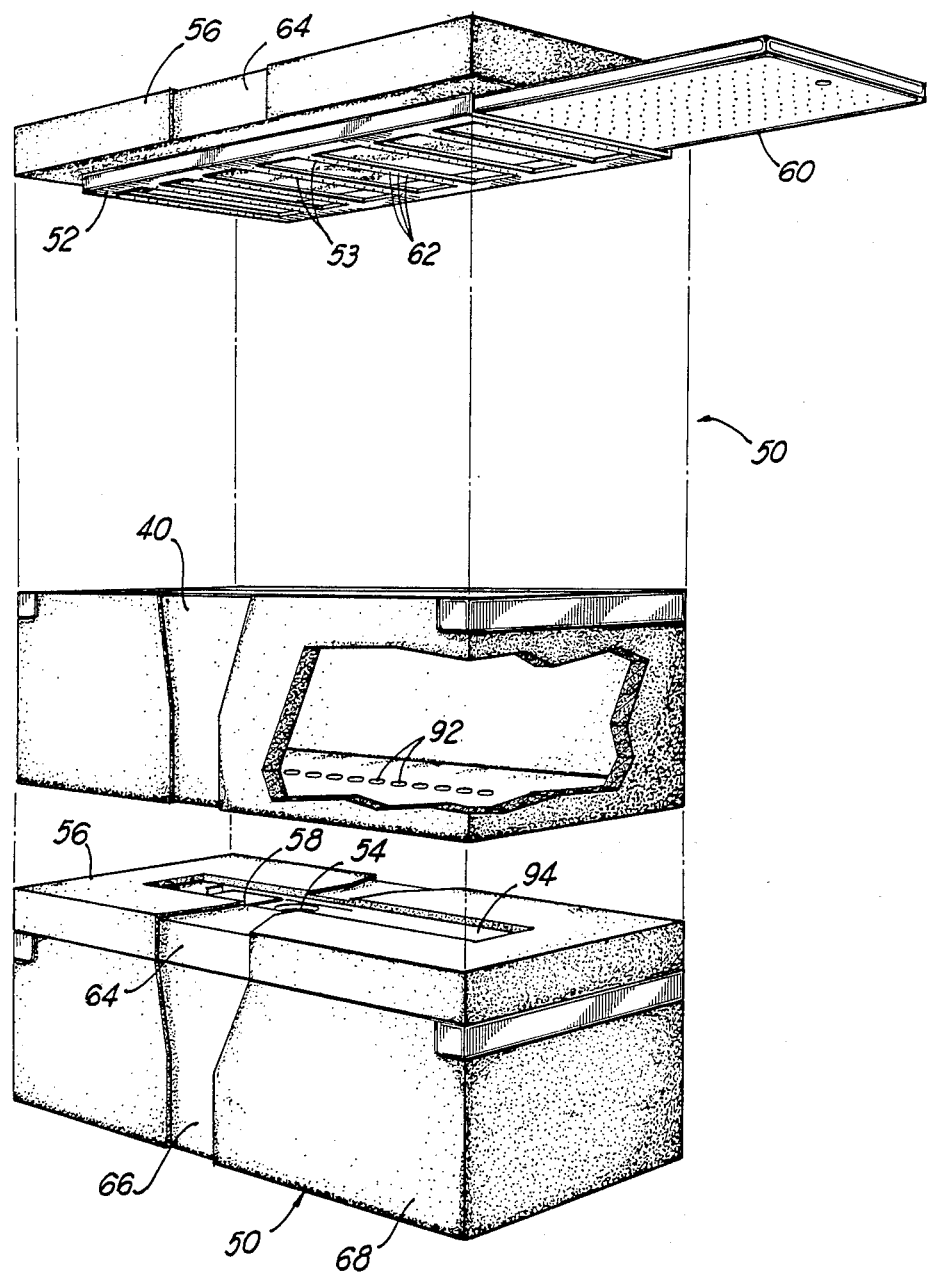
FIG. 2 is an exploded perspective view of two stacked shipping and storage containers of the present invention in a second embodiment of the invention.

A second embodiment of the container of the present invention is illustrated as container 50 in FIG. 2. Container 50 is in several respects similar to container 10 illustrated in FIG. 1 but differs in that it includes a manifold 52 communicating with an opening 54 in lid 56, which opening may be controlled by a sliding closure 58. Manifold 52 depends from the underside of lid 56 and may be configured to provide a sleeve into which ice cavity 60 is slid, just as ice cavity 20 illustrated in FIG. 1 is slid into bracket 16. Additionally, cross-arms 53 of manifold 52 support ice cavity 60 and provide passages connecting with opening 54 through which water may pass and from which it may drip through holes 62 distributed across the entire underside of manifold 50. Cross-arms 53 are spaced apart so that a substantial portion of the underside of ice cavity 60 is not obstructed. Thus, the cooling and water-providing functions of ice cavity 60 are identical to those described above. Additionally, inclusion of manifold 52 makes it possible to introduce water through opening 54 from any desired water source. For instance, it may be desirable to "wet down" the contents of container 50 immediately after packing container 50 using a hose or other water source to provide water through opening 54. Additionally, by stacking containers 50 with their closures 58 open, water from upper containers will pass through lower ones to provide moisture in lower containers rather than being routed to the container sides by channels 64 and 66 in lid 56 and chest 68 respectively. Alternatively, closure 58 may be closed when it is not desired that water or air enter the container 50 through the manifold 52. Manifold 52 may be fabricated, cast or otherwise constructed of aluminum, plastic or other suitable material.

Figure 3:
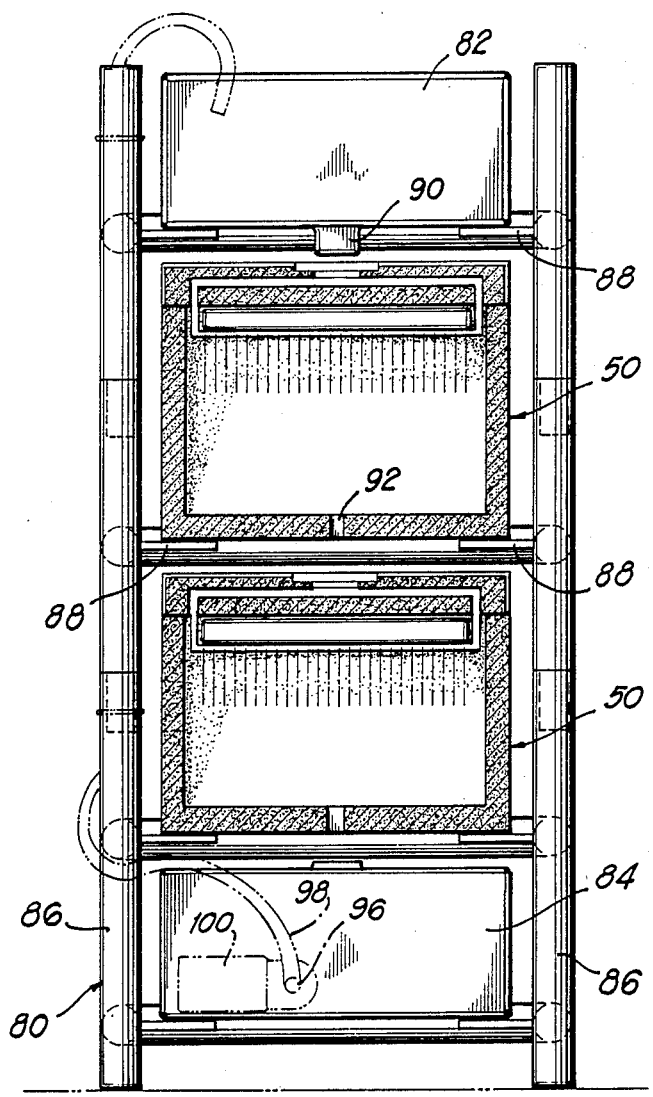
FIG. 3 is a front elevational view of the shipping and storage containers of the present invention illustrated in FIG. 2 mounted in a rack together with an external ice container at the top and drip pan at the bottom.

Chest 50 may be mounted, particularly for transport by truck, train, airplane or the like, in a rack 80 illustrated in FIG. 3 together with two containers 50 and ice or water reservoir 82 and a drip pan 84. As will be readily understood by one of ordinary skill in the art, rack 80 is a structure including legs 86 and shelves or brackets 88 on which the ice or water reservoir 82, the desired number of containers 50 and drip pan 84 are arranged from top to bottom in a stacked configuration. With closures 58 open, water may exit ice and water reservoir 82 through nozzle 90 as ice within the reservoir melts or water is metered out by an appropriate valve (not shown). Nozzle 90 is positioned above opening 54 in the uppermost container 50. Such water thus travels through manifold 52 and drips onto the contents of container 50. Water then falls out of holes 92 in the bottom of container 50 and, in the case of a container above another container 50, into the channel 94 oriented in the top of lid 56 under holes 92. Such water then passes into the next manifold 52 through its opening 54 and the cycle is repeated until water passing through the holes 92 in the lower-most container 50 is collected in a drip pan 84. Drip pan 84 may be provided with a valve 96 to permit draining of the pan when that is desired, or to permit water collected in drip pan 84 to be recirculated to reservoir 82 through tube 98 by pump 100 so that the cycle can continue.

As will also be readily understood by one of ordinary skill in the art, a number of alternative configurations of rack 82 could also be used. Such configurations include structures in which leg sections interconnect containers 50 in order to lock them together, containers 50 are molded with mating parts so that they can be stacked directly, and other rack arrangements are created in order to position containers 50 in the described relationship to each other and, if desired, to external sources of water and cooling while providing containers 50 with adequate support and protection to permit their transportation.

The preceding description and drawings of the present invention are provided for purposes of explanation and illustration. Modification and changes may be made to the invention as described and illustrated without departing from its scope and spirit.

I claim:

1. A stackable container for transporting and storing fruits, vegetables or other plant materials in a cool, moist environment, comprising a chest having an upper surface, a means for holding an ice cavity in the chest, a removable ice cavity having a plurality of apertures through which melted water may drip from the cavity into the interior of the chest when the cavity is in the holding means and a means for accessing the removable ice cavity without displacing any portion of the upper surface of the chest.

2. The container of claim 1 wherein the upper surface of the chest comprises a removable lid and the holding means comprises at least one bracket positioned on the underside of the lid.

3. The container of claim 2 wherein the means for accessing the removable ice cavity without displacing any portion of the upper surface of the chest comprises an occludable opening in at least one wall of the chest through which the ice cavity may be inserted or removed.

4. The container of claim 3 wherein the bottom of the chest includes at least one hole for draining water from the chest.

5. The container of claim 4 wherein the lid contains depressions to receive water from above the lid and channel such water to the sides of the chest.

6. The container of claim 4 further comprising a manifold mounted near the top of the container, communicating with an opening outside of the container and having a plurality of holes through which water may drip into the interior of the container.

7. The container of claim 6 further comprising a closure for the manifold opening.

8. A rack for holding a plurality of containers in accordance with claim 7 comprising a rigid structure having means to support a plurality of containers in accordance with claim 7 in a vertically stacked arrangement above a vessel to receive water drained from the containers.

9. The rack of claim 8 further comprising a means for recirculating water from the vessel to the upper most of the containers in the rack.

10. A stackable container for transporting and storing fruits, vegetables or other plant materials comprising a chest fabricated of an insulating material having at least one opening in the bottom through which water may drain from the chest, a lid for the chest, at least one bracket attached to the underside of the lid for holding an ice cavity, a removable ice cavity having a plurality of apertures through which melted water may drip from the cavity into the interior of the chest when the cavity is mounted in the bracket and a means for accessing the removable ice cavity without displacing any portion of the lid.

11. A stackable container for transporting and storing fruits, vegetables or other plant materials comprising:
   a. a chest fabricated of an insulating material having at least one opening in the bottom through which water may drain from the chest;
   b. a lid for the chest;
   c. a manifold mounted on the underside of the lid communicating with an outside opening, having a plurality of holes through which water may drip and forming a means for receiving and holding an ice cavity;
   d. a removable ice cavity having a plurality of apertures through which melted water may drip from the cavity into the interior of the chest when the cavity is mounted in the bracket; and
   e. a means for accessing the removable ice cavity without displacing any portion of the lid.

12. A rack and container structure for field to display case transportation and storage of fruits, vegetables or other plant materials in a cool, moist environment, comprising a rack for holding a plurality of containers in a vertically stacked arrangement, a plurality of portable, insulated chest-like containers, each having at least one occludable upper opening through which water may pass and be distributed throughout the container, a pan to receive water drained from the containers, an ice or cool water reservoir mounted at the top of the rack to dispense cool water into the upper-most container mounted in the rack, and a means for recirculating water from the pan to the reservoir.

13. The container of claim 1 wherein the upper surface includes depressions to receive water from above the upper surface and channel such water to the sides of the chest.

* * * * *

UNITED STATES PATENT AND TRADEMARK OFFICE
CERTIFICATE OF CORRECTION

PATENT NO. : 4,845,959

DATED : July 11, 1989

INVENTOR(S) : Charles (NMI) Magee

It is certified that error appears in the above-identified patent and that said Letters Patent is hereby corrected as shown below:

At column 2, line 46 between "holes" and "on" insert --24--.

At column 2, line 52 replace "24" with --20--.

At column 2, line 56 replace "wall" with --cavity--.

At column 2, line 63 between "channels" and "to" insert --38--.

At column 3, line 30 replace "50" with --52--.

Signed and Sealed this

Fifteenth Day of May, 1990

*Attest:*

HARRY F. MANBECK, JR.

*Attesting Officer*   *Commissioner of Patents and Trademarks*